United States Patent
Laser et al.

(10) Patent No.: US 9,563,798 B1
(45) Date of Patent: Feb. 7, 2017

(54) READING INVISIBLE BARCODES AND OTHER INVISIBLE INSIGNIA USING PHYSICALLY UNMODIFIED SMARTPHONE

(71) Applicant: VL Engineering, Inc., Cincinnati, OH (US)

(72) Inventors: Vadim Laser, Montgomery, OH (US); Max Burkhart, Montgomery, OH (US)

(73) Assignee: V.L. Engineering, Inc., Cincinnati, OH (US)

( * ) Notice: Subject to any disclaimer, the term of this patent is extended or adjusted under 35 U.S.C. 154(b) by 0 days.

(21) Appl. No.: 15/244,984

(22) Filed: Aug. 23, 2016

(51) Int. Cl.
  *G06K 7/10* (2006.01)
  *G06K 19/06* (2006.01)
  *G06K 7/14* (2006.01)

(52) U.S. Cl.
  CPC ....... *G06K 7/10742* (2013.01); *G06K 7/10801* (2013.01); *G06K 7/1413* (2013.01); *G06K 19/0614* (2013.01); *G06K 19/06028* (2013.01); *H04M 2201/20* (2013.01); *H04M 2250/52* (2013.01)

(58) Field of Classification Search
  USPC .................................. 235/455, 462.11, 468
  See application file for complete search history.

(56) References Cited

U.S. PATENT DOCUMENTS

| | | | |
|---|---|---|---|
| 5,633,947 A | 5/1997 | Sibbald | |
| 5,959,296 A | 9/1999 | Cyr et al. | |
| 6,177,683 B1 * | 1/2001 | Kolesar | G06K 7/10722 235/468 |
| 6,857,573 B2 | 2/2005 | Urano et al. | |
| 6,903,726 B1 | 6/2005 | Bock | |
| 7,516,899 B2 | 4/2009 | Laser | |
| 7,702,108 B2 | 4/2010 | Amon et al. | |
| 7,712,667 B2 | 5/2010 | Laser | |
| 7,884,382 B2 | 2/2011 | Setlur et al. | |
| 7,966,267 B2 | 6/2011 | Auslander et al. | |
| 8,331,724 B2 | 12/2012 | Rhoads | |
| 8,620,021 B2 | 12/2013 | Knudson | |
| 8,848,970 B2 | 9/2014 | Aller | |
| 8,879,832 B2 | 11/2014 | Dalal | |
| 8,997,241 B2 | 3/2015 | Terwilliger et al. | |
| 9,008,353 B2 | 4/2015 | Aller | |
| 2008/0135860 A1 | 6/2008 | Setlur et al. | |
| 2009/0050700 A1 * | 2/2009 | Kamijoh | G06K 17/0022 235/440 |

OTHER PUBLICATIONS

W.Q. Peng, et al., Synthesis and photoluminescence of ZnS:Cu nanoparticies, Optical Materials, 2006, 29, 313-317. (5 pages).
Sheng Cao, et al., Long-lived and Weil-resolved Mn2+ Ion Emissions in CuInS—ZnS Quantum Dots, Scientific Reports, 2014, article No. 7510, 1-8. (8 pages).

(Continued)

*Primary Examiner* — Ahshik Kim
(74) *Attorney, Agent, or Firm* — Hasse & Nesbitt LLC; Daniel F. Nesbitt

(57) ABSTRACT

A method and system for enabling a conventional smartphone to read and authenticate an invisible barcode or other invisible insignia printed using an invisible printing ink containing a phosphorescent luminophore, and a software application, without a hardware alteration to the smartphone.

17 Claims, 7 Drawing Sheets

P - Phosphorescence intensity in relative units

(56) References Cited

OTHER PUBLICATIONS

Heleen F. Sijbom, et al., Luminescent Behavior of the $K_2SiF_6:Mn^{4+}$ Red Phosphor at High Fluxes and at the Microscopic Level, ECS Journal of Solid State Science and Technology, 2016, 5(1), R3040-R3048. (9 pages).
Michael Kalloniatis and Charles Luu, Temporal Resolution, 2007, Webvision, University of Utah, http://webvision.med.utah.edu/book/part-viii-gabac-receptors/temporal-resoution/ (8 pages).
Invisible Barcode Technology, IBM, http://researcher.ibm.com/researcher/view_group.php?id=5608 (3 pages).
John R. Hattersley, Invisible and Fluorescing Bar Code Printing and Reading, 2011, InData Systems, http://www.spiritdatacapture.co.uk/specs/invisible-bar-code.pdf. (12 pages).

\* cited by examiner

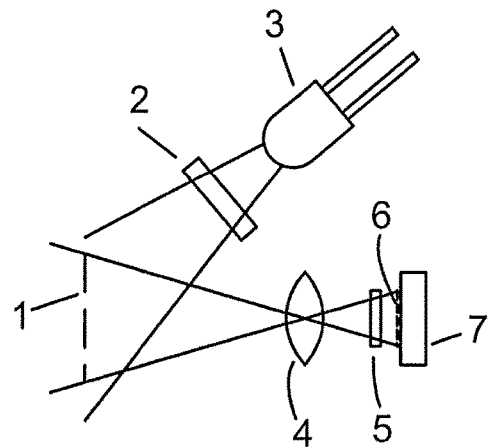
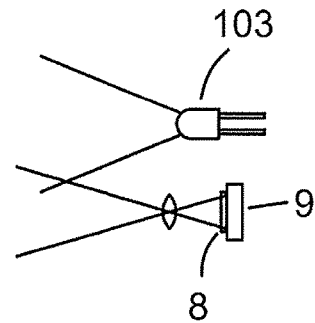
Fig. 1.    Fig. 2
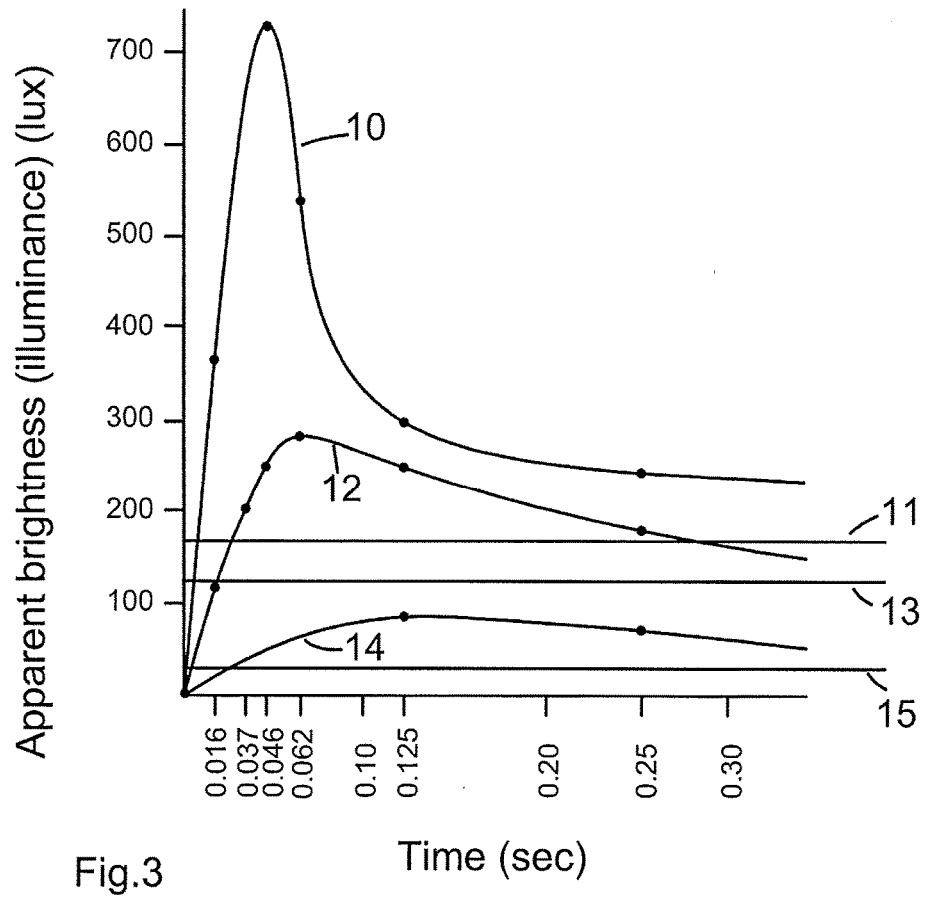
Fig. 3

P - Phosphorescence intensity in relative units

READING INVISIBLE BARCODES AND OTHER INVISIBLE INSIGNIA USING PHYSICALLY UNMODIFIED SMARTPHONE

FIELD OF THE INVENTION

The invention relates to hidden image acquisition, steganography, and data hiding.

BACKGROUND OF THE INVENTION

Invisible to a human eye barcodes and other secret insignia are known in the art. They are used for identification and authentication of documents, products, and packages. Such invisible information is printed with inks based on photoluminescent dyes or pigments. Graphics printed with such materials do not selectively reflect, absorb or emit light in the visible spectrum at power level sufficient for detection by unaided eye, therefore are invisible to people.

For viewing invisibly printed insignia and reading invisible barcodes various devices are known in the art, such as those described in the U.S. Pat. Nos. 5,959,296, 6,857,573, 7,516,899, 7,712,667, the disclosures of which are incorporated by reference in their entireties. The known in the art devices for reading invisible insignia, including barcodes, are based on image sensors having spectral sensitivity that stretches beyond the visible spectrum of 370 nm to 690 nm. The other known approach is using fluorescent compounds that emit on visible wavelengths when excited by the energy outside the visible spectrum such as ultraviolet or infrared. For example, the apparatus described in U.S. Pat. No. 7,966,267, the disclosure of which is incorporated by reference in its entirety, for authenticating various articles uses a UV light source. In order to utilize information presented by the invisible insignia the special devices are needed. These devices perform the following functions: image acquisition, recognition, evaluation, barcode decoding, saving encoded data, and communicating it to a different site. Such devices comprise an illumination light source having specific excitation bandwidth, image sensor equipped with special optical filter, and microprocessor for system control, data processing and communications. High cost associated with complexity and sophistication of the invisible insignia acquisition and processing devices often precludes implementation of the invisible barcodes and other invisible insignia technology. Thus, the need exists for a way to enable the sophisticated and ubiquitous products such as smartphones to read the invisibly printed barcodes and other insignia.

Known in the art is use of ubiquitous smartphones for reading visible barcodes such as QR-code, Datamatrix, linear barcodes, and other machine readable insignia. Smartphones also can process information and communicate over USB or wireless ports. However, the smartphones are not capable of acquiring image of barcodes invisible to people. Thus, a need exists for a method and a system making possible reading invisible barcodes and acquiring other secret insignia with the smartphones using only the hardware means already built into the smartphones.

A roadblock for implementing the common approach for acquiring invisible insignia and reading invisible barcodes with the smartphones is the presence of a special optical filter in the smartphone camera optical path that limits its spectral sensitivity exclusively to the visible range. This measure is necessary for proper operation of the solid state high resolution color image sensors built into the smartphones.

The built-in illuminating LED of the smartphones emits only visible light for taking pictures in low light situations. The white illuminating LED does not emit ultraviolet or near infrared energy. This condition excludes using typical invisible inks based on fluorophores producing the Stock or anti-Stock wavelength shift.

BRIEF SUMMARY OF THE INVENTION

The present invention makes it possible to enable a conventional smartphone to read invisible barcodes without any additional hardware attachment or upgrade. Some applications of the invisible insignia, especially of the invisible barcodes, benefit from an ability to verify authenticity of the printed pattern. Such verification can be performed by measuring two important parameters of a luminophore component of a printing ink used to print the invisible insignia or barcode.

An aspect of the present invention is the ability to read an invisible barcode or acquire invisible insignia using entirely the visible light spectrum.

Another aspect of the present invention is the use of a built-in white-illuminating light emitting diode (LED) as the light source for target illumination of the invisible barcode or invisible insignia.

Another aspect of the present invention is enabling a smart phone to authenticate the printing ink by measuring essential photonic properties of its luminophore ingredient.

Another aspect of the present invention is enabling a smart phone to read in one continuous operation both invisible and visible insignia, including barcodes.

A further aspect of the present invention is the use of a conventional smartphone running a software application for detecting an invisible barcode or invisible insignia, without any hardware attachment or upgrade.

The present invention is based on use of printing inks that contain dyes, phosphors or quantum dots that are phosphorescent in the visible spectrum that absorb the pump energy of the white illuminating LED built into the smartphone. Such printing inks containing phosphorescent materials in low concentrations leave printed images invisible to the eye under normal lighting conditions. Under steady ambient illumination the printed insignia absorbs and re-emits the visible light energy. The low concentration of fluorophore material in the ink makes the insignia invisible at both weak and bright ambient light levels. At common daylight or artificial light illumination, the human eyes integrate light information with the time constant of about 100 milliseconds or even longer. After bright LED illumination has terminated, the invisible insignia becomes visible during afterglow that diminishes within a short afterglow time period that is much shorter than human eye sensitivity recovery time. That helps to reduce a chance of revealing the action of reading the invisible insignia, which may be important in security applications.

The present invention reads an invisible barcode and other invisible printed insignia by acquiring an image during the afterglow time period of said insignia and within a time shorter than a human eye sensitivity recovery time. In an aspect of the invention, the afterglow time period is up to 1000 milliseconds, including up to 50 milliseconds. In a further aspect of the invention, the image is acquired within 100 milliseconds, more preferably within 50 milliseconds, and including within 30 milliseconds, of the termination of the bright LED illumination. The invisible barcode and other invisible printed insignia comprises a printing ink containing a luminophore component having an afterglow decay time constant of not less than 0.5 millisecond and not more than 1 second and preferably in the range of 5 millisecond to 30 millisecond.

BRIEF DESCRIPTION OF THE SEVERAL VIEWS OF THE DRAWINGS

FIG. 1 shows a concept of the prior art of taking invisible images by devices with CMOS or CCD image sensors.

FIG. 2 illustrates presence of the band limiting interference filter in conventional smartphone cameras.

FIG. 3 illustrates physiological effect of eye reaction on short bright flashes of light.

DETAILED DESCRIPTION OF THE INVENTION

Definition of Terms

Figure 4:
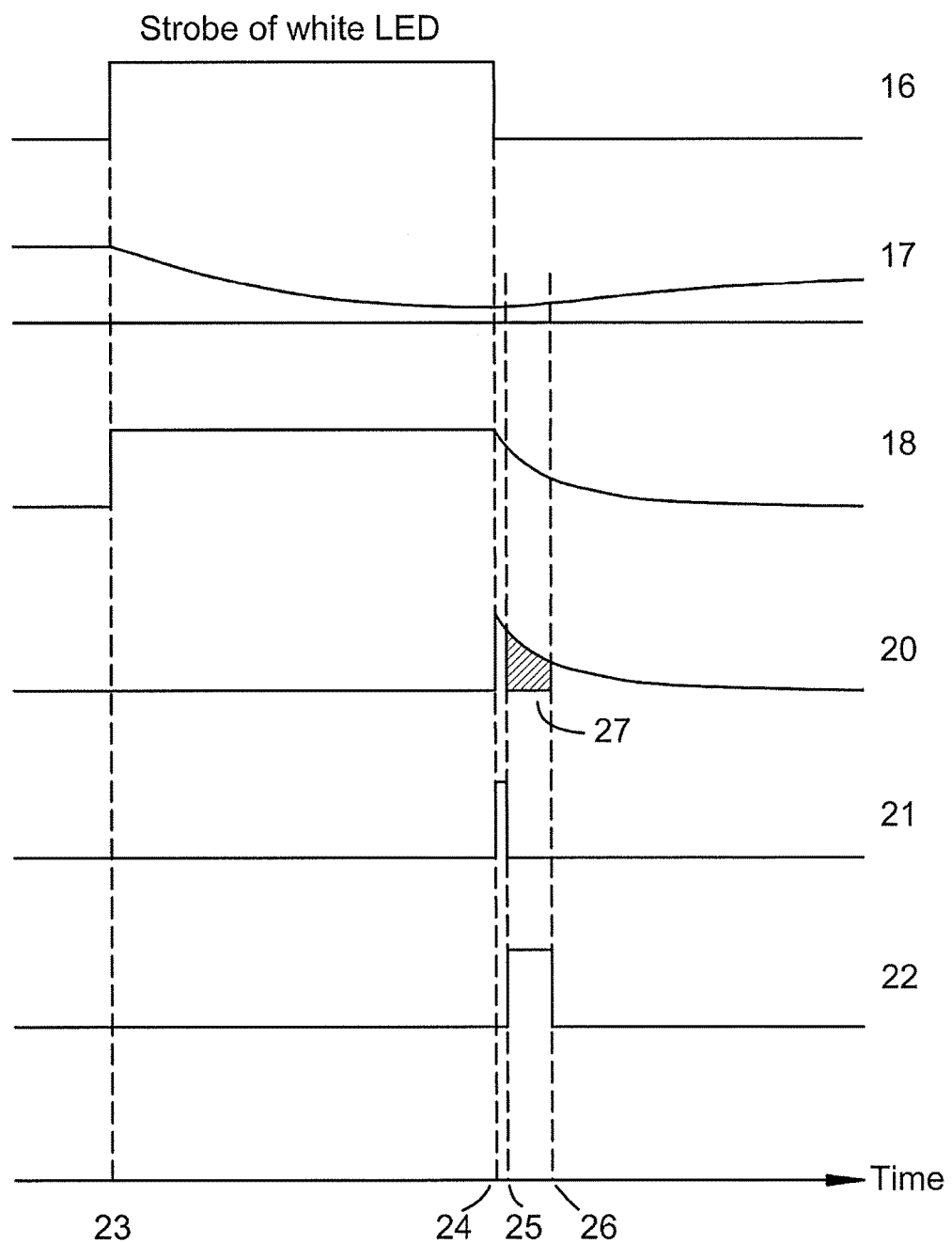
FIG. 4 illustrates the timing relationship between the illumination pulse, image sensor exposure and eye sensitivity.

The term "LED transient time" is defined as a period of time from the moment of termination of the illuminating LED current to the moment when the illuminating LED emitted light ceases to an effectively zero level and the electrical transient noise associated with the illuminating LED current termination extinguishes to an effectively zero level.

The term "TVL" is defined as the temporary value of the LED transient time during measurement.

The term "ΔTVL" is defined as the increment of the temporary value of the LED transient time during measurement.

The term "BL0" is defined as the measured value of the noise floor of the brightness level.

The term "BLM" is defined as the measured value of the brightness level.

In the context of the present invention the terms "camera" and "image sensor" are interchangeable, unless indicated otherwise.

In the context of the present invention the terms "software application" and "mobile app" are interchangeable, unless indicated otherwise.

The phrase "pump energy" means photonic energy absorbed by luminophore atoms to cause the excited state responsible for the emission of photons.

As used herein, a "conventional smartphone" is a device that includes at least a high performance processor or computer, a high definition camera or image sensor, an LED based strobe light, and a display. The process of image acquisition of the invisible insignia begins with the conventional smartphone illuminating the target with its bright white illuminating LED. Following a short transition period after the illuminating LED is turned 'off', the camera of the smartphone begins an exposure period. During the camera exposure period, the afterglow of a phosphorescent luminophore material in the printing ink of the invisible insignia builds up an electronic image in the image sensor. The phosphorescent luminophore can be selected such that the significant level of afterglow luminescence lasts not longer than for a few milliseconds, which is much shorter time than 100 milliseconds inertia of a typical human eye response. The time of image acquisition is synchronized with the end of active phase of the white illuminating LED pulse. The time period when the phosphorescent image starts to build electric charges on the image sensor pixels begins almost immediately after the white illuminating LED is turned off. This time, known as exposure time, lasts for a period controlled by the software application. A short time delay can be added prior to the start of the exposure period in order to exclude an influence of a transient noise and possible afterglow of the illuminating LED phosphor. Factors influencing calculation of the optimum exposure time period are: afterglow time constant of the ink phosphor, amount of energy emitted by the illuminating LED, camera sensitivity in the visible band where the phosphorescence signal is emitted, and the distance from the lens to the targeted insignia.

The phosphor can be selected with an afterglow decay time that is considerably shorter than 100 milliseconds in order to reduce or eliminate a chance that the phosphorescence of the luminophore in the invisible insignia becomes detectable by or visible to an unaided eye of a bystander or operator of the smartphone. Examples of the suitable phosphors are:

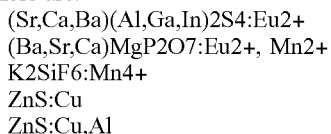

In some embodiments of the invention, use of both invisible insignia and visible insignia can be beneficial. It is especially useful in a case when one or both insignias are barcodes. This aspect of the invention enables reading both visible and invisible insignias in one continuous operation. The image of visible insignia can be taken prior to or during a time period while the illuminating LED is active, and the image of invisible insignia can be taken after the illuminating LED is turned 'off'. The order of printing of the invisible barcodes and other invisible insignia, and printing of the visible barcodes and other visible insignia is not critical in the present invention.

The following procedure (hereinafter, "Procedure A") provides for taking images of an invisible insignia with a smartphone.

a. Turn the illuminating LED of the smartphone 'off';
b. Turn the camera of the smartphone 'on';
c. Initially run the smartphone camera in the mode with the automatic adjustment of the camera sensitivity typically implemented as the camera gain and exposure time, for a time period that is not less than 20 milliseconds (ms) and not more than 5 seconds, preferably in the range of 200 ms to 500 ms;
d. Retrieve the values of the gain and exposure time from the smartphone camera;
e. Save the gain and exposure time values as GAINA and EXPA, respectively, to be used in a later step;

f. Set the camera sensitivity to be fixed, that is, no longer automatically adjustable;

g. Set the camera sensitivity to a low level that precludes the image sensor from overexposure when the illuminating LED is turned 'on';

h. Turn the illuminating LED 'on';

i. Delay for a time period that is not less than 1 ms and not more than 5 seconds, preferably in the range of 20 ms to 500 ms;

j. Turn the illuminating LED 'off';

k. Delay for a time period of the LED transient time;

l. Set the camera sensitivity to the previously saved values GAINA and EXPA of the camera gain and exposure time, or set the camera sensitivity to other suitable values of gain and exposure time;

m. Enable the camera to take a picture;

n. Delay for a time period of the exposure time expiration and/or other time suitable for image frame synchronization;

o. Transfer the electronic image of the one frame specifically exposed as described above, from the camera to the smartphone memory and/or the smartphone processor;

p. Set the camera sensitivity to be automatically adjustable and/or restore other smartphone camera settings changed during the steps above; and q. Perform barcode decoding and/or other image processing as a particular user application requires.

To successfully take a picture or capture an image of the invisible insignia using the afterglow emission of the phosphorescent luminophore, the camera needs to be ready to take the picture or capture the image at the start of the afterglow emission with the sensitivity set at reasonably high level, significantly different from the low sensitivity needed for a camera picture taken or image capture during the illuminating LED operation. This is accomplished either by allowing the camera to run in a self-adjusting mode for sensitivity prior to turning the illuminating LED 'on', measuring and saving such sensitivity values, and then using these saved values to restore the camera sensitivity after the flash of light from the illuminating LED has been extinguished; or by using a fixed, predetermined sensitivity value in situations with repetitive reading of invisible insignia in unchanging ambient lighting. The camera sensitivity is turned 'down' during the bright emission of the operating illuminating LED. The sensitivity is restored or turned 'up', after the illuminating LED current is turned 'off' and a passage of some additional LED transient time to avoid contamination of a picture by the artifacts such as transient electric noise and possible afterglow of the illuminating LED phosphor.

Since the afterglow power of the phosphorescent luminophore of the insignia begins to decay immediately after the emission from the illuminating LED ceases, it is important to optimize the LED transient time, between being as short as possible to minimize loss of the afterglow emission energy of the phosphorescent luminophore, while being sufficiently long to exclude the effects of said artifacts.

Figure 10:
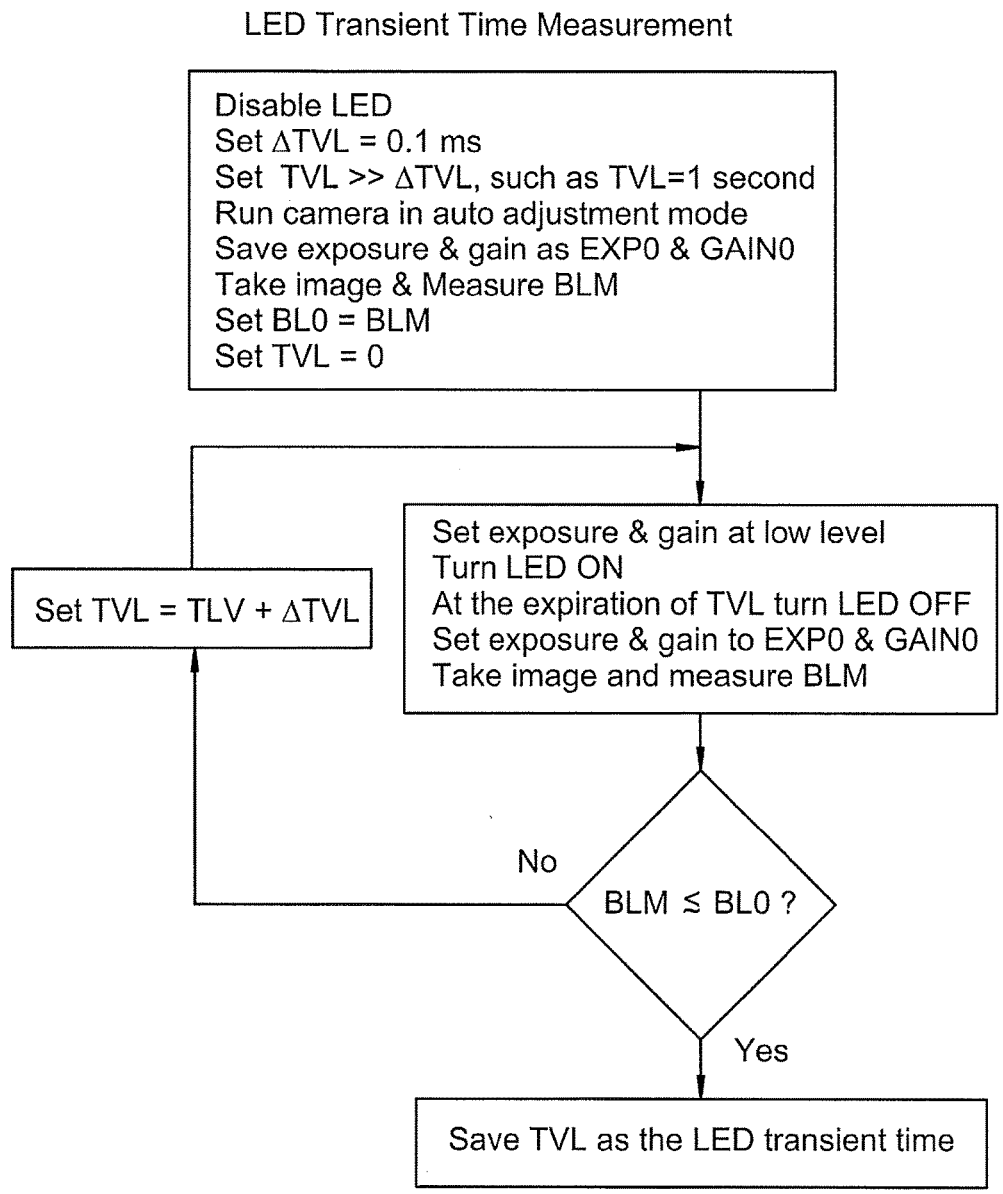
FIG. 10 is a flowchart of main steps for the LED Transient Time measurement.

In an aspect of the invention, the LED transient time can be automatically measured using the following steps:

a. Secure the smartphone in a position with its on-board camera aimed at a neutral target such as non-fluorescent and non-phosphorescent white target that is located at a reasonable distance, such as 3 cm to 5 cm, and with the ambient light subdued;

b. Run a program subroutine performing instructions in accordance with the LED transient time measurement flowchart shown in FIG. 10;

c. Disable the illuminating LED;

d. Set the increment value $\Delta TVL$ for the LED transient time adjustment at a level significantly lower than the anticipated LED transient time, such that $0.05$ ms$<\Delta TVL<0.5$ ms, and preferably $\Delta TVL=0.1$ ms;

e. Set TVL$>>\Delta TVL$, preferably TVL=1 second;

f. With the illuminating LED disabled and following the steps listed above in Procedure A, take an image. Measure and save the average brightness level as BL0. For most makes and types of smartphones, this average brightness value should be near zero. Because there are no phosphorescent materials in the field of view and the illuminating LED light afterglow, if any, must be drastically shorter than the selected 1 second transient delay, only the image sensor noise could possibly contribute to this value;

g. Enable the illuminating LED; and h. Set TVL=0 and proceed to the looping action consisting of incrementing the TVL by the $\Delta TVL$ value, taking an image following the steps listed in Procedure A, and measuring its brightness BLM. Upon completing each loop, the value of BLM will be reduced, unless BLM started at less or nearly equal to BL0. For the condition when BLM is detected to be nearly equal to BL0, declare the current value of TVL to be used as the LED transient time (or LED transient delay) in all future taking of pictures or capturing of images of an invisible insignia.

Known in the art and most popular method for capturing invisible fluorescent images of barcodes and other insignia is based on a straightforward concept that the solid state image sensors have spectral sensitivity that is broader than the visible portion of the electromagnetic radiation spectrum. The invisible inks are used for printing invisible barcodes. These inks contain dyes or pigments that are fluorescent or absorptive in the infrared or UV regions. High quality silicon image sensors have good sensitivity in the near infrared and ultraviolet. However, for the purpose of improving performance the image sensors used in the smartphones and other high resolution cameras have been equipped with the optical filters effectively blocking all wavelengths outside of the visible spectrum from 400 nm to 650 nm. FIG. 1 depicts a combination of the main components of such prior art implementation, where convention invisible insignia 1 is illuminated by an excitation energy source comprising an LED 3 and a bandpass filter 2. The fluorescent light emitted by the conventional fluorescent dyes or pigments in the conventional insignia 1 passes through the imaging lens 4 and a receiving bandpass filter 5, before striking the image sensor 7. In the case with conventional smartphones, as shown on FIG. 2, the mass-produced image sensors 9 are manufactured with the built-in UV and IR cut-off filter 8 or such separate filter is placed in front of the image sensor, or in front of the lens.

The present invention uses an invisible ink containing a phosphorescent luminophore with a medium range of afterglow decay time, rather than a fluorescent luminophore. Such phosphorescent luminophores may be inorganic phosphors, organic dyes, and quantum dots. The excitation source can be the white illuminating LED built into the conventional smartphone. There are number of advantages the invisible barcodes can offer.

In some cases invisible barcodes have been used on packages and products because of cosmetic reasons, but more often application using invisible barcodes and other invisible insignia have issues of security, such as anti-counterfeiting, intellectual property protection, and others. In a security-related project, it is often desirable to ensure that the invisible barcode remains invisible to the user or an observer, even at the time when the invisible barcode is being read or imaged with the smartphone. Reading a phosphorescence-based invisible insignia with a conventional smartphone involves charging the phosphorescent luminophore contained in the printing ink of the invisible insignia with the light energy of the white illuminating LED of the smartphone, and taking a picture or capturing an image of the vicinity of the invisible insignia during the time of afterglow of the phosphorescent luminophore. In order to make the afterglow image less detectable by the naked eye of an observer, the decay time of the afterglow of the phosphorescent luminophore shall be short. During the excitation time the light from the illuminating LED is very bright. For deeper charging the luminophore, the duration of the excitation pulse shall be at least five times longer than the decay time constant of the luminophore. FIG. 3 illustrates how perceived brightness and eye sensitivity recovery depends on the light pulse duration and its intensity. The curve 10 represents apparent brightness that an eye perceives when the bright pulse of light with the intensity of 170 lux lasts 50 milliseconds. At the end of the pulse the perceived brightness is about 4.3 times higher than the factual brightness. The sensation rapidly diminishes such that in a quarter of a second it is only 50% stronger than factual brightness. The eye accommodates to the changing level of brightness with a certain speed. The speed of accommodation is faster for larger changes of light intensity. During the duration of the bright pulse, the eye sensitivity is diminishing, and upon extinction of the bright pulse the sensitivity begins to recover to a level (line 11) appropriate for the darker light condition. The curves 12 and 14 illustrate the levels of apparent brightness in the case of weaker light pulses of 126 lux (line 13) and 32 lux (line 15). The eye sensitivity changes become progressively less and slower in the cases of weaker illuminating light pulses. These considerations suggest using a phosphorescent luminophore in invisible inks with the decay time in the range of 1 millisecond to 50 milliseconds. During this short time, immediately following expiration of the illuminating LED pulse, the eye sensitivity is very low for the reasons described above.

In an embodiment of the invention, a ZnS:Cu luminophore was used having a decay time constant of 18 milliseconds.

FIG. 4 is the timing diagram of the major events taking place during acquiring of an image of the invisible insignia using the smartphone. The line 16 represents a pulse of light produced by the white illuminating LED falling onto the target area. The curved line 17 demonstrates variations of sensitivity of the human eye looking in the direction of the target area. Prior to the start 23 of the illuminating LED pulse, the eye sensitivity was determined by the ambient light conditions. From the beginning of the pulse 23 to the end of the pulse 24, the eye sensitivity drops, then begins a slow recovery toward the level that existed prior to point 23. The line 18 shows the brightness of the printed insignia as a combination of the illuminating LED light reflected from the indicia (duration between 23 and 24) and light emitted by the insignia as a result of afterglow of the luminophore component of the invisible ink used to print the insignia. The afterglow process begins during the strobing of the white LED (between 23 and 24), and continues beyond point 24 and gradually decays asymptotically. The curve 20 shows just the afterglow component. The pulse 22 shows the time during which the image sensor of the smartphone is enabled to "see" the target image and to absorb the photons of light emitted by the invisible insignia. This time period, known in the art as "exposure time" begins at the point 25 and ends at the point 26, while the afterglow intensity is still strong enough. The short period of time exhibited on line 21 between the points of time 24 and 25 represents a delay of the beginning of the exposure period in order to exclude influence of transient noise and the possible LED phosphor afterglow. For convenience, we call this time delay of exposure after the end of the illuminating LED pulse the "transient delay". The shaded area 27 on the line 20 represents the photonic energy that causes building image of the phosphorescent insignia.

In order to take an image of the invisible insignia or read the invisible barcode, the smartphone camera needs to be properly aimed. Since the target is invisible, aiming can be accomplished in one of two ways described below:

First way: A visible insignia such as a barcode can be printed near or around a target and can serve as a reference point. In this case, taking a picture with a smartphone appears as a typical procedure for photographing a visible barcode. A typical black barcode can serve as said reference point and carry data in addition to the data contained in the invisible barcode. Presence of the visible barcode enhances security in two ways: by splitting the data between visible and invisible barcodes, and by masking the process of reading of the invisible barcode. The image of the visible barcode can be acquired by the camera either using ambient light prior to issuing the flash of light or during the time when the white illuminating LED is emitting light. The image sensor sensitivity at this time must be preset to a properly low level to prevent saturation. The image sensor sensitivity during the phosphorescent afterglow is preset, as discussed above, to the level in accordance with the ambient conditions. In this scenario, the image of the invisible insignia does not need to be displayed during smartphone targeting. Only one white illuminating LED pulse is needed for capturing the invisible insignia. This mode of operation does not allow the image sensor to be constantly in the automatic gain and sensitivity adjustment mode. The image sensor sensitivity (gain and exposure values) shall be preset to the fixed levels. One set of values is valid during the time from 38 to 40 (see FIG. 6) when the illuminating LED emits light. A second set of values for gain and exposure are used during period from 40 to 43 when exposure to afterglow light takes place. At all other times the image sensor may be dormant. In this case the display may not show any image at all during reading of invisible insignia. That may be desirable from an operational security standpoint.

Second way: The smartphone camera can run in a video mode, repeatedly emitting the illuminating LED pulses, capturing afterglow emission, and displaying the image of the invisible insignia or of the invisible barcode on the smartphone screen. The video rate can be slower than standard. The smartphone mobile app can be setup to decode the barcode as soon as possible or wait for a command from the operator to decode it, then send it out or do whatever a high level routine is programmed to do. The image of the undecoded invisible barcode can be sent to a remote computer for decoding, archiving, or other processing. During exposure time the camera sensitivity shall be switched to a prepared fixed value. When the illuminating LED emits bright light the camera sensitivity is turned down to a low level that precludes image sensor saturation. The image of the visible barcode can be taken during this time.

Figure 5:
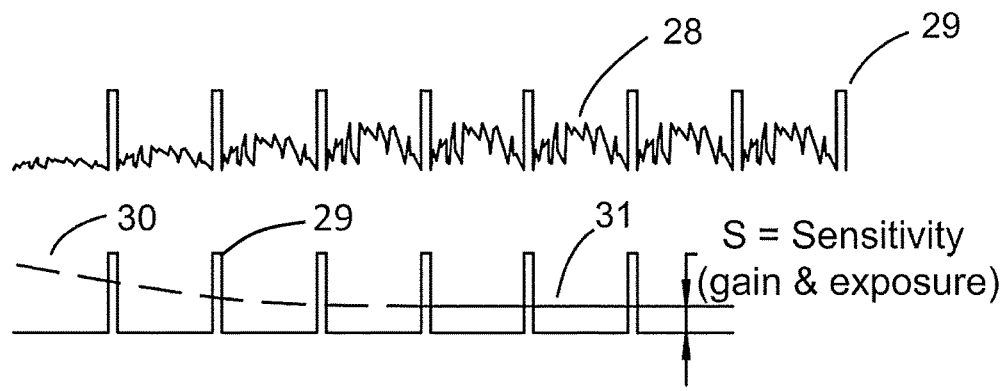
FIG. 5 illustrates the function of the camera sensitivity parameters.
Figure 6:
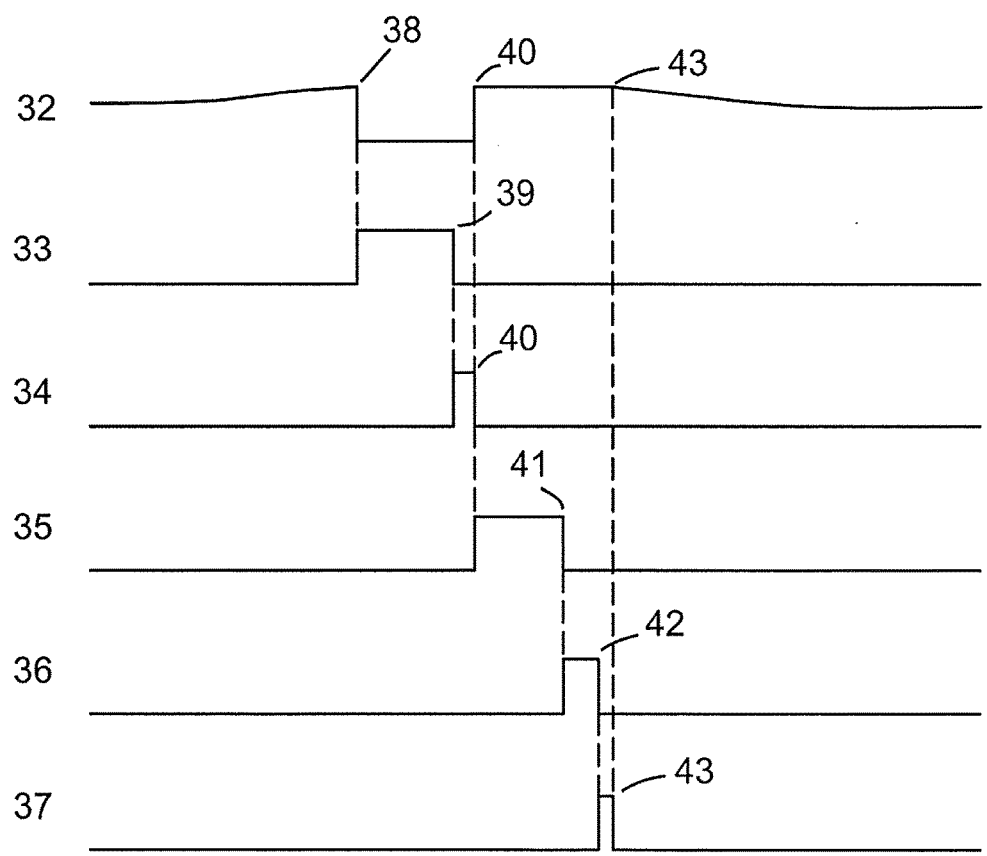
FIG. 6 is a timing diagram of the events enabling a smartphone to capture and process images of invisible barcodes.

FIG. 5 illustrates the process of finding an appropriate sensitivity level for capturing the afterglow image. FIG. 6 is a timing diagram illustrating sequence of main events resulting in successful capturing and processing of the invisible image. In FIG. 5, the top graph is the combination of the frame synchronization pulses 29 connected by the random line 28, which represents the frame video content. The lower graph shows only video frame pulses 29 and the descending line 30-31 representing the camera sensitivity. The camera sensitivity is determined by its gain and exposure period. As the image signal 28 on the image sensor begins to grow and the camera automatic sensitivity adjustment is enabled, the sensitivity in the area 30 is adjusted to become lower. The sensitivity stabilizes in the area 31 with the certain levels of gain and exposure.

The line 32 in FIG. 6 shows the status of the gain and exposure at different periods. The automatic control of the gain and exposure is active until the point 38. At the moment of point 38, the values of gain and exposure are read and saved by the program, and the camera sensitivity is switched off and remains off until point 40. At the moment or point 40, the values of gain and sensitivity are reloaded into the corresponding registers of the image sensor, which restores the image sensor sensitivity and provides proper conditions for acquiring the afterglow image. With the sensitivity turned down during the time between point 38 and point 39, when the illuminating LED illuminates the invisible target, the image sensor avoids overexposure and instantly becomes ready for acquisition of the afterglow image. A short time indicated on the line 34 between the points 39 and 40 is the LED transient time. After expiration of the LED transient time at the point 40, the exposure period on line 35 begins. The lines 36 and 37 show when the electronic image is being transferred from the image sensor to the smartphone processor for barcode decoding or other image processing as required by the particular application. At the point 43 the camera may be switched back to the automatic gain and exposure control for continued viewing of the target area.

Some applications of the invisible insignia, especially of invisible barcodes, benefit from an ability to verify authenticity of the printed pattern. Such verification can be performed by measuring two important parameters of the luminophore component of the printing ink: 1) the speed of the afterglow decay, and 2) the perceived color of phosphorescence. If the decay time constant is larger than the time required for taking two images in the afterglow light, provided both images are taken while being illuminated by the afterglow of same single pulse of the illuminating LED, then a process illustrated in FIG. 7 can be used. Otherwise, FIG. 8 illustrates the sequence of events in the case of the afterglow decay time constant is shorter than the time duration of the single frame.

Figure 7:
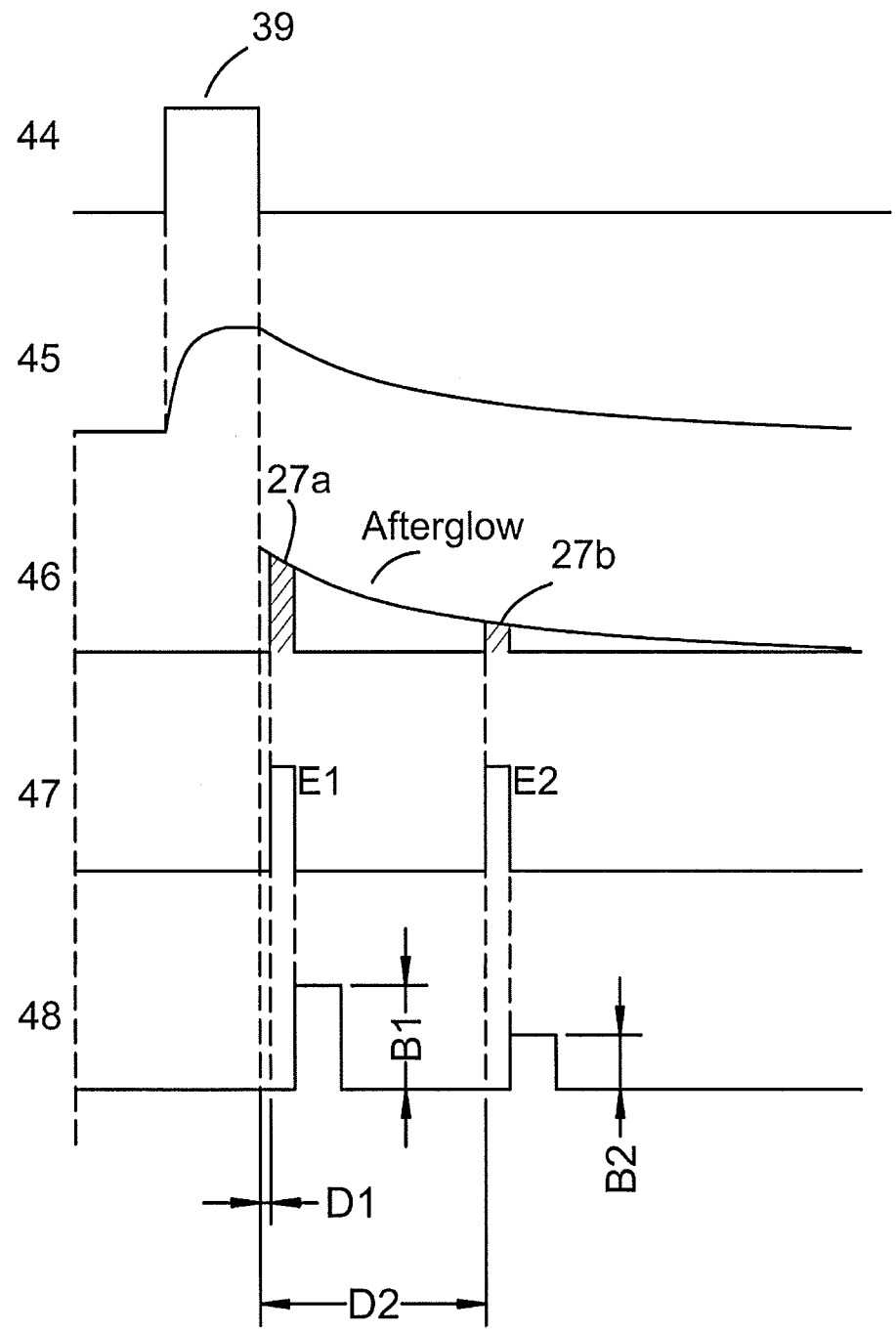
FIG. 7 is a timing diagram illustrating a method of measuring the longer decay times of an invisible ink afterglow.
Figure 8:
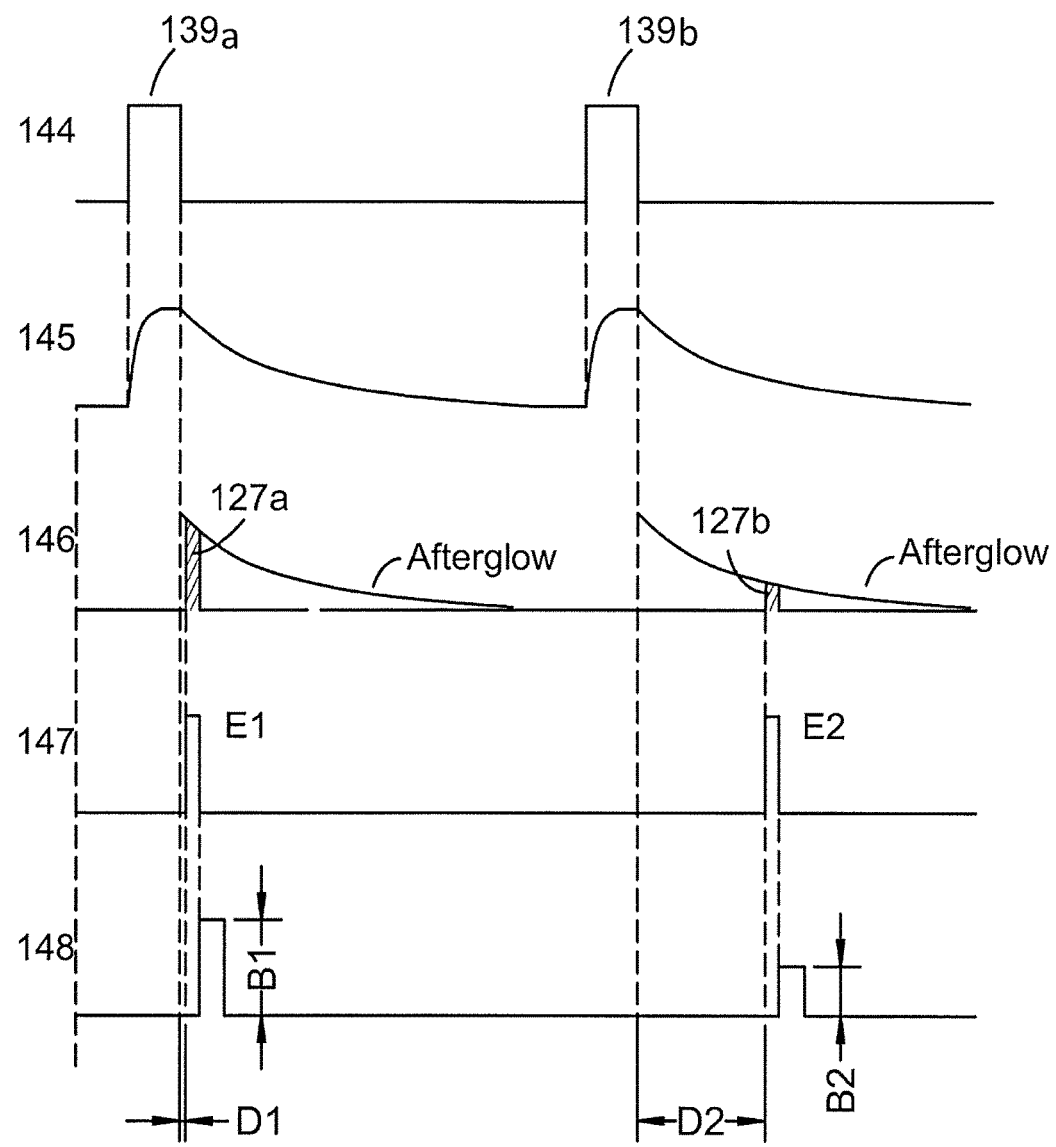
FIG. 8 is a timing diagram illustrating a method of measuring the shorter decay times of the invisible ink afterglow.

In FIG. 7, line 44 shows the pulse 39 of the electric current flowing through the white illuminating LED that illuminates the target and causes the phosphorescent luminophore in the printing ink of the invisible insignia to produce afterglow light as show on line 45.

The line 47 shows the two exposure pulses E1 and E2, which are the exposure pulses producing the two consecutive images of the same target image. The first exposure pulse E1 starts after expiration of the short transient delay D1 but the second exposure pulse E2 begins after expiration of the significantly longer delay D2. At the time when the E2 exposure is active, the afterglow intensity is noticeably weaker than at the time of E1 exposure. This is illustrated by the shaded pulses on the line 46, which represent photonic energies accumulated during the corresponding exposure periods. The amplitudes of pulses B1 and B2 on the line 48 illustrate brightness of the two images of the same target. Ratio of these brightness values B1/B2 indicates speed of the afterglow decay. This parameter is intrinsic to the printing ink.

In a case of a printing ink with a short afterglow time, when it is impossible to take two images following each other after the common pulse of the white illuminating LED, the process can be accomplished by taking two separate frames following two separate pulses of the white illuminating LED. This is illustrated in FIG. 8. The line 144 shows two consecutive and identical pulses 139a and 139b of the electric current flowing through the white illuminating LED that illuminates target and causes it to produce two consecutive and identical pulses of afterglow light as show on line 145. The line 147 shows the two exposure pulses E1 and E2, which are the exposure pulses producing images of the same target image in the two consecutive frames. The first exposure pulse E1 starts after expiration of the short transient delay D1 but the second exposure pulse E2 begins after expiration of the significantly longer delay D2. At the time when the E2 exposure is active, the afterglow intensity is noticeably weaker than at the time of E1 exposure. This is illustrated by the shaded pulses on the line 146, which represent photonic energies accumulated during the corresponding exposure periods. The amplitudes of pulses B1 and B2 on the line 148 illustrate brightness of the two images of the same target. Ratio of these brightness values B1/B2 indicates speed of the afterglow decay. This parameter is intrinsic to the printing ink.

The two images of the same target are taken in the two separate frames. Each time the white illuminating LED pulse 139 illuminates the target after a considerable delay between the illuminating LED pulses, so the afterglow 145 resulting from the first LED pulse is practically extinguished and does not contribute to the formation of the second image. Care must be taken to ensure that both LED pulses emit equal amounts of energy. Thus, the brightness ratio B1/B2 of the images of the same invisible target represents afterglow decay time constant of the printing ink luminophore.

Figure 9:
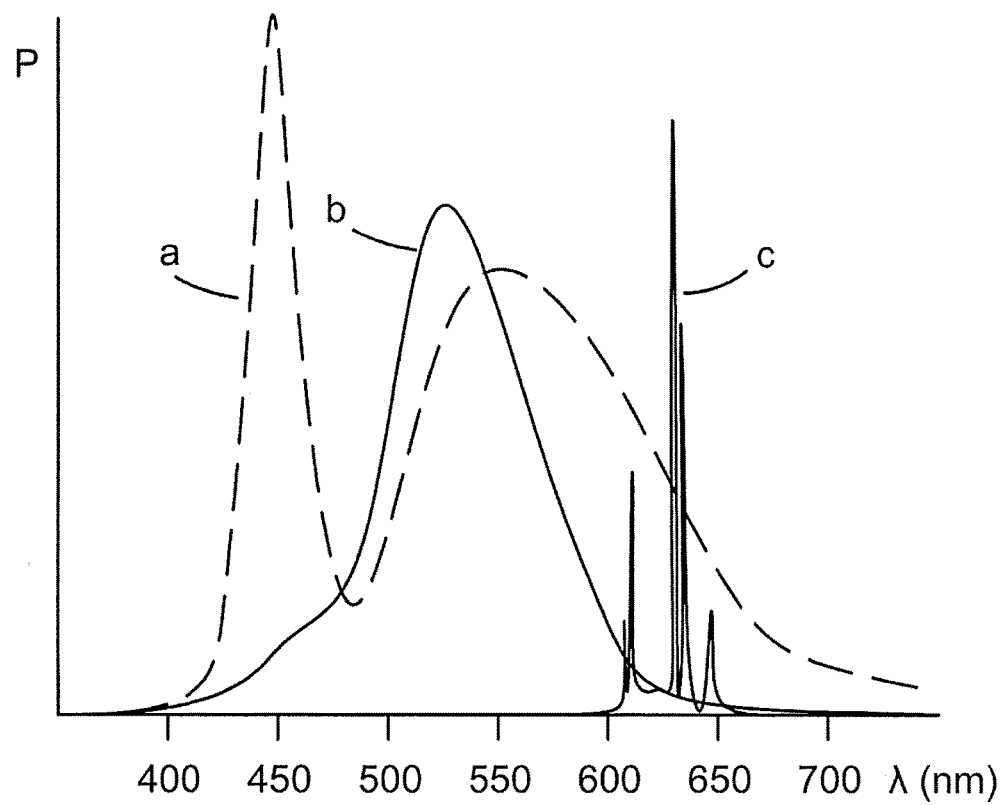
FIG. 9 is a diagram illustrating the ink phosphor features used for verification of insignia authenticity.

The other intrinsic to the ink parameter useful for ink authentication is the color of phosphorescence. FIG. 9 presents spectral curves of the luminance of the two phosphorescent luminophores emitting different colors. On the background of the spectral curve "a" of a typical LED used in the smartphones, the two curves representing phosphorescence of the ink luminophores are shown. The curve "b" depicts emission of the ZnS:Cu material and indicates green color while the curve "c" depicts emission of the K2SiF6: Mn4+ phosphor on the red wavelengths. Both phosphors are excited with the visible light having center wavelength around 450 nm at room temperature.

To come up with convenient numbers for afterglow color measurement, the mobile app being run by the smartphone processor selects a set of bright RGB pixels belonging to the target image. Then for this set of RGB pixels it integrates subset values of Red, Green, and Blue pixels into the three sums: R, G, and B. The ratios of R/B and G/B represent the identification coefficients intrinsic to the invisible security ink. Mixing two or more phosphorescing luminophores in various combinations allows creation of very large number of invisible inks with uniquely authenticatable photonic signatures.

Various models of smartphones may have white illuminating LED manufactured using various technologies, therefore the illuminating LEDs, generally being white, might have different spectral characteristics. Accuracy of measuring spectral features of the insignia ink can be improved by taking into consideration the particular illuminating LED spectral features. Performing the following steps will result in obtaining the spectral parameters intrinsic to the LED of a particular smartphone, which later can be used to calibrate or normalize spectral measurements of the invisible insignia emission.

a. Secure the smartphone in a position such that its camera is aimed at a neutral target such as non-fluorescing and non-phosphorescing white paper located at a fixed distance of about 2 cm to 10 cm and with the ambient light subdued.

b. Take a picture with the smartphone camera enabled for taking pictures using the illuminating LED light for illuminating the target during exposure time, appropriately short and not causing image sensor saturation.

c. Measure average brightness values individually for the Red, Green, and Blue pixels.

d. Calculate the normalization ratios "rn" and "gn" of the measured values:

$$rn = Red/Blue$$

$$gn = Green/Blue.$$

Save these normalization values for future use in measurement of the invisible insignia spectral characteristics in the following manner:

a. Measure average brightness values of the insignia image individually for the Red, Green, and Blue pixels and save them correspondingly as Ri, Gi, and Bi.

b. Calculate the invisible insignia spectral characteristics normalized for the illuminating LED spectral features as:

$$r = (Ri/Bi)/rn, \text{ and}$$

$$g = (Gi/Bi)/gn.$$

What is claimed is:

1. A smartphone configured for reading an invisible printed insignia or barcode that comprises a printing ink containing a luminophore that is phosphorescent in the visible spectrum, the smartphone including a camera, a white light emitting diode (LED), and a computer that controls the camera and the LED, the computer programmed with software application to emit a flash of bright white light from the LED toward an invisible printed insignia or barcode, and to acquire an image of the phosphorescing luminophore within a period of time of less than 1000 milliseconds after the terminating of the flash of bright white light of the LED.

2. A smartphone-based system for reading of an invisible printed insignia or barcode, comprising: an invisible printed insignia or barcode that comprises a printing ink containing a luminophore that is phosphorescent in the visible spectrum, and a smartphone including an illuminating light emitting diode (LED), a camera image sensor, and a software application that configures and controls the illuminating LED to emit a flash of bright white light that can be directed toward the invisible printed insignia or barcode, and the camera image sensor to acquire a visible image of said invisible printed insignia or barcode during the afterglow period of the phosphorescent luminophore.

3. The system of claim 2 wherein the phosphorescent luminophore has an afterglow decay time constant of not less than 0.5 millisecond and not more than 1 second, and preferably in the range of 5 milliseconds to 30 milliseconds.

4. The system of claim 3 wherein the phosphorescence luminophore is at least one chemical selected from the group consisting of phosphorescing soluble dyes, phosphor particles, and quantum dots.

5. The system of claim 2 wherein the smartphone is configured and controlled to turn the illuminating LED on and then turn the illuminating LED off; and then to enable an exposure of the camera image sensor after the emitted light from the illuminating LED has ceased.

6. The system of claim 2 wherein the software application configures the smartphone:

a) to initially run the camera image sensor in an automatic adjustment mode of a camera gain and an exposure time prior to turning the illuminating LED on;

b) to measure and save a first set of values of a camera gain and an exposure time;

c) to set a camera sensitivity to a low level that precludes the camera image sensor from an overexposure;

d) to turn the illuminating LED on, to wait for a period of time that is not less than 1 millisecond and not more than 5 seconds, preferably in the range of 20 milliseconds to 500 milliseconds;

e) to turn the illuminating LED off;

f) to delay for an LED transient time of the illuminating LED, g) to load the first set of values of the camera gain and the exposure time back into a camera settings, or to load other suitable fixed values of a camera gain and an exposure time into the camera settings;

h) to enable the camera image sensor to acquire an electronic image at said first set of values of the camera gain and the exposure time;

i) to wait for an expiration of the exposure time; and j) to transfer the electronic image acquired from the camera image sensor to the processor for processing.

7. The system of claim 6 wherein the software application is configured to determine the LED transient time during an installation of the software application into the smartphone.

8. The system of claim 7 wherein the software application provides an automatic measurement of the LED transient time by:

a) securing the smartphone with the camera image sensor aimed at a uniform non-fluorescing and non-phosphorescing white target;

b) acquiring an image of said target in substantially low ambient light without activating the LED;

c) measuring the average brightness of said image and saving said average brightness measurement as a reference value BL0;

d) acquiring a series of images in accordance with claim 6 where the LED transient time value progressively increments from the initial value TVL=0 by a small amount $\Delta TVL$, where $0.05 \text{ ms} < \Delta TVL < 0.5 \text{ ms}$, and preferably $\Delta TVL = 0.1 \text{ ms}$;

e) processing each image for measuring an average brightness and comparing a value of the average brightness with the value BL0;

f) stopping the taking of new images as soon as the average brightness value is less than or nearly equal to BL0; and g) declaring a last value of incremented value TVL to be the LED transient time and saving said last value of TVL as the LED transient time for a future use in acquiring electronic images of an invisible insignia.

9. The system of claim 6 wherein the software application provides an option to automatically determine the spectral characteristics of the white illuminating LED.

10. The system of claim 9 wherein the software application is configured to determine the spectral characteristics of the white illuminating LED by the steps of:
   a. securing the smartphone in a position such that the camera image sensor is aimed at a uniform non-fluorescing and non-phosphorescing target such as white paper located at a fixed distance of about 2 to 10 cm;
   b. acquiring an image with the camera image sensor enabled for acquiring an image using the illuminating LED light;
   c. measuring an average brightness value individually for the Red, Green, and Blue pixels;
   d. calculating the normalization ratios "rn" and "gn" of the measured values, where:

$rn$=Red/Blue, and $gn$=Green/Blue; and e. saving the values "rn" and "gn" for a future use as normalization coefficients.

11. The system of claim 10 wherein the smartphone is configured for automatic measurement of the spectral characteristics of the printing ink by the steps of:
   a. measuring an average brightness value of an image of the insignia, individually for the Red, Green, and Blue pixels, and saving them correspondingly as values of Ri, Gi, and Bi; and
   b. calculating the spectral characteristics of the invisible insignia normalized for the spectral features of the illuminating LED, as:

$r=(Ri/Bi)/rn$, and $g=(Gi/Bi)/gn$; and c. using the spectral characteristics "r" and "g" to authenticate the invisible ink used to print the invisible insignia.

12. The system of claim 2 wherein the software application has an option to authenticate the invisible ink used to print the invisible insignia by its decay time, according to the steps of:
   a. acquiring a first image of the invisible insignia according to the steps of: turning the illuminating LED on, turning the illuminating LED off, and enabling an exposure of the camera image sensor after completion of an LED transient time delay when the emitted light from the illuminating LED has ceased;
   b. calculating and saving an average brightness of the pixels of the first image of the invisible insignia as a value of P1;
   c. acquiring a second image of the invisible insignia using the same procedure as in the step "a" above, but with an increased value of an LED transient time, preferably to be approximately equal to an expected time constant of an afterglow decay of the invisible printing ink, not less than 0.2 times and not more than 4 times of the expected time constant of the afterglow decay of the invisible printing ink;
   d. calculating and saving an average brightness of the same pixels as used in calculating the value of P1, as a value of P2; and
   e. calculating a ratio P1/P2 as an ink decay time indicator that is intrinsic to the printing ink.

13. A method for reading an invisible barcode or other invisible insignia formed from a printing ink containing a luminophore phosphorescent in the visible spectrum with a smartphone containing a camera, a white light emitting diode (LED), and a computer that controls the camera and the LED, comprising the steps of: a) illuminating an invisible insignia or barcode with a flash of white light from the LED, and b) after terminating of the flash of white light and during an afterglow period of the phosphorescent luminophore, acquiring an image of the phosphorescent luminophore of the invisible insignia or barcode.

14. The method of claim 13, where the image is acquired within a period of time of less than 100 milliseconds after the termination of the flash of white light.

15. A method for reading, in one continuous operation, of both: 1) a visible insignia, which can include a barcode, formed with a conventional visible printing inks, and 2) an invisible insignia, which can include a barcode, formed with an invisible printing ink containing at least one luminophore phosphorescent in the visible spectrum, using a smartphone including an image sensor, a white light emitting LED, a memory, and a processor running a software application, including the steps of: causing the white LED to emit a pulse of light, reading the visible insignia before expiration of said pulse of light, and reading the invisible insignia shortly after the expiration of said pulse of light, and during an afterglow of the at least one luminophore.

16. The method of claim 15 wherein the processor running the software application comprises the steps of:
   a. temporary disabling use of the illuminating LED until the step "f" below;
   b. running the smartphone camera in a mode with an automatic adjustment of the camera sensitivity, typically implemented as a camera gain and an exposure time, for a time period that is not more than 2 seconds, preferably in the range of 100 ms to 500 ms;
   c. after the camera sensitivity has been adjusted, retrieving the values of the gain and exposure time from the smartphone camera;
   d. saving the gain and exposure time values as GAINB and EXPB, respectively;
   e. setting optionally a camera sensitivity to a low level that precludes the image sensor from an overexposure;
   f. turning the illuminating LED;
   g. after the camera sensitivity parameters have been adjusted, transferring the one frame of the electronic image of the visible insignia to a first area of the smartphone memory and/or the processor;
   h. turning the illuminating LED off;
   i. delaying for a time period of an LED transient time;
   j. setting the camera sensitivity to a gain of GAINB and an exposure of EXPB;
   k. taking one frame of an electronic image of the invisible insignia;
   l. transferring the one frame of the electronic image of the invisible insignia to a second area of the smartphone memory and/or the smartphone processor;
   m. optionally setting the camera sensitivity to an automatically adjustable mode; and
   n. decoding of the visible and invisible barcodes using corresponding images located in the first and second memory areas or other image processing as a particular user application requires.

17. The method of claim 15 wherein the processor running the software application comprises the steps of:
   a. temporary disabling use of the illuminating LED until the step "f" below; running the smartphone camera in a mode with an automatic adjustment of the camera sensitivity, typically implemented as a camera gain and an exposure time, for a time period that is not more than 2 seconds, preferably in the range of 100 ms to 500 ms;
b. after the camera sensitivity has been adjusted, retrieving the values of the gain and exposure time from the smartphone camera;
c. saving the gain and exposure time values as GAINB and EXPB, respectively;
d. transferring the one frame of the electronic image of the visible insignia to a first area of the smartphone memory and/or the processor;
e. set optionally a camera sensitivity to a low level that precludes the image sensor from an overexposure;
f. turning the illuminating LED on;
g. turning the illuminating LED off;
h. delaying for a time period of an LED transient time;
i. setting the camera sensitivity to a gain of GAINB and an exposure of EXPB;
j. taking one frame of an electronic image of the invisible insignia;
k. transferring the one frame of the electronic image of the invisible insignia to a second area of the smartphone memory and/or the smartphone processor;
l. optionally setting the camera sensitivity to an automatically adjustable mode, and/or restore other smartphone camera settings changed during the steps above; and
m. decoding of the visible and invisible barcodes using corresponding images located in the first and second memory areas or other image processing as a particular user application requires.

* * * * *

UNITED STATES PATENT AND TRADEMARK OFFICE
CERTIFICATE OF CORRECTION

PATENT NO.        : 9,563,798 B1                                            Page 1 of 1
APPLICATION NO.   : 15/244984
DATED             : February 7, 2017
INVENTOR(S)       : Vadim Laser et al.

It is certified that error appears in the above-identified patent and that said Letters Patent is hereby corrected as shown below:

In the Claims

Claim 10, Column 13, Line 17, delete "m" and insert --rn--.

Claim 10, Column 13, Line 20, delete "m" and insert --rn--.

Claim 14, Column 14, Line 9, delete "where" and insert --wherein--.

Claim 16, Column 14, Line 42, delete "LED;" and insert --LED on;--.

Signed and Sealed this
Ninth Day of March, 2021

Drew Hirshfeld
*Performing the Functions and Duties of the
Under Secretary of Commerce for Intellectual Property and
Director of the United States Patent and Trademark Office*